(12) United States Patent
Chi et al.

(10) Patent No.: US 8,099,381 B2
(45) Date of Patent: Jan. 17, 2012

(54) PROCESSING HIGH-DIMENSIONAL DATA VIA EM-STYLE ITERATIVE ALGORITHM

(75) Inventors: Yun Chi, Santa Clara, CA (US); Yihong Gong, Saratoga, CA (US); Shenghuo Zhu, Santa Clara, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 746 days.

(21) Appl. No.: 12/199,912

(22) Filed: Aug. 28, 2008

(65) Prior Publication Data
US 2009/0299705 A1    Dec. 3, 2009

Related U.S. Application Data

(60) Provisional application No. 61/056,594, filed on May 28, 2008.

(51) Int. Cl.
*G06F 7/60* (2006.01)
*G06F 17/10* (2006.01)
(52) U.S. Cl. ...................................................... 706/62
(58) Field of Classification Search .................. 707/104; 706/62
See application file for complete search history.

(56) References Cited

U.S. PATENT DOCUMENTS

2008/0071843 A1* 3/2008 Papadimitriou et al. ...... 707/204

OTHER PUBLICATIONS

Shashua, A; Hazan, T; "Non-Negative Tensor Factorization with Applications to Statistics and Computer Vision", Proceedings of the 22$^{nd}$ International Conference on Machine Learning, Bonn, Germany, 2005. 8 pages.*

Chi et al, Probabilistic Polyadic Factorization and its Application to Personalized Recommendation, CIEM '08, Oct. 26-30, Napa Valley, California, U.S. (2008) 10 pages.*

Tamir Hazan and Simon Polak and Amnon Shashua. Sparse Image Coding Using a 3D Non-Negative Tensor Factorization. Tenth IEEE International Conference on Computer Vision (ICCV'05) vol. 1, pp. 50-59, 2005. IEEE Computer Society, Los Alamitos, CA, USA.

Thomas Hofmann. Unsupervised Learning by Probabilistic Latent Semantic Analysis. Machine Learning, vol. 42, Nos. 1/2, pp. 177-196, Springer, 2001.

M. Morup and L. K. Hansen and S. M. Arnfred. Algorithms for sparse non-negative Tucker (also named Honmf). Technical report, Department of Informatics and Mathematical Modeling, Technical University of Denmark, 2007.

Amnon Shashua and Tamir Hazan. Non-negative tensor factorization with applications to statistics and computer vision, ICML '05: Proceedings of the 22nd international conference on Machine learning, pp. 792-799, Bonn, Germany, 2005. ACM, New York, NY, USA.

Ding Zhou and Shenghuo Zhu and Kai Yu and Xiaodan Song and Belle L. Tseng and Hongyuan Zha and C. Lee Giles. Learning multiple graphs for document recommendations, WWW '08: Proceeding of the 17th international conference on World Wide Web, pp. 141-150, Beijing, China, 2008. ACM, New York, NY, USA.

(Continued)

*Primary Examiner* — Jeffrey A Gaffin
*Assistant Examiner* — Ola Olude-Afolabi
(74) *Attorney, Agent, or Firm* — Bao Tran; Joseph Kolodka

(57) ABSTRACT

Systems and methods are disclosed for factorizing high-dimensional data by simultaneously capturing factors for all data dimensions and their correlations in a factor model, wherein the factor model provides a parsimonious description of the data; and generating a corresponding loss function to evaluate the factor model.

18 Claims, 2 Drawing Sheets

OTHER PUBLICATIONS

Shenghuo Zhu and Kai Yu and Yun Chi and Yihong Gong. Combining content and link for classification using matrix factorization, SIGIR '07: Proceedings of the 30th annual international ACM SIGIR conference on Research and development in information retrieval, pp. 487-494, Amsterdam, The Netherlands, 2007. ACM, New York, NY, USA.

* cited by examiner

PROCESSING HIGH-DIMENSIONAL DATA VIA EM-STYLE ITERATIVE ALGORITHM

The present application claims priority to Provisional Application Ser. No. 61/056,594 filed May 28, 2008, the content of which is incorporated by reference.

The present invention relates to processing high-dimensional data.

BACKGROUND

In many applications, data are of high dimension. How to analyze all the dimensions simultaneously for various applications such as personalized recommendation and summarization is a challenging issue.

Pairwise relationship exists in many applications and dyadic data analysis has been studied extensively by various researchers. For example, the well known Latent Semantic Indexing (LSI) focuses on dyadic data consisting of term-document pairs. However, in many applications, data are polyadic, i.e., they are of higher dimensions. Networked data are such an example: in a research paper corpus such as CiteSeer, an author, in an article on a specific topic, cites a reference. In this example, a data record is an author-topic-reference triple, i.e., with dimension of three.

Collaboratively tagging data is another example: in collaborating tagging systems such as Del.icio.us, a user assigns a set of tags to a given url (which corresponds to a Web page). Here data records are user-tag-url triples. Combining all aspects of the data into data analysis is a challenging issue and various approaches have been proposed for fusing information into a single framework. Most existing research work only analyzes pairwise relationship among different dimensions, and then combines the analysis results afterwards. Such an approach loses the higher order (higher than pairwise) dependency among various dimensions of data.

Some studies have used a set of concepts to capture all the pairwise relationship simultaneously. Because these approaches use the same concepts to represent all the pairwise relationship among various dimensions, they offer better performance than those approaches that consider the pairwise relationships independently. This second approach often gives better performance because it describes the real data using a more accurate model. However, this approach usually uses a linear combination to fuse all pairwise relationships. Such a linear combination is somewhat ad hoc—it is difficult to find a good intuition behind the coefficients as well as principled ways to set the values of the coefficients.

SUMMARY

In one aspect, systems and methods are disclosed for factorizing high-dimensional data by simultaneously capturing factors for all data dimensions and their correlations in a factor model; and generating a corresponding loss function to evaluate the factor model.

In another aspect, systems and methods are disclosed for factorizing high-dimensional data by simultaneously capturing factors for all data dimensions and their correlations in a factor model, wherein the factor model provides a parsimonious description of the data; and generating a corresponding loss function to evaluate the factor model.

In the preferred embodiment, the factor model simultaneously determines factors and their correlation to provide a more parsimonious description of the data and to provide insights about the data. Minimizing the associated loss can derive the parameter of the model which implies the factorization results accordingly.

Advantages of the preferred embodiment may include one or more of the following. This system can produce factors with higher quality than those produced by considering only pairwise relationship. These factors together with their correlation can be used for personalized recommendation, clustering, summarization, among others. Potential applications to the factor model include: extracting and monitoring coherent groups of people and topics, ranking and recommending important people and documents, or summarizing and visualizing data.

BRIEF DESCRIPTION OF THE DRAWINGS

The system will be readily discerned from the following detailed description of an exemplary embodiments thereof especially when read in conjunction with the accompanying drawing in which like parts bear like numerals throughout the several views.

DESCRIPTION

Figure 1:
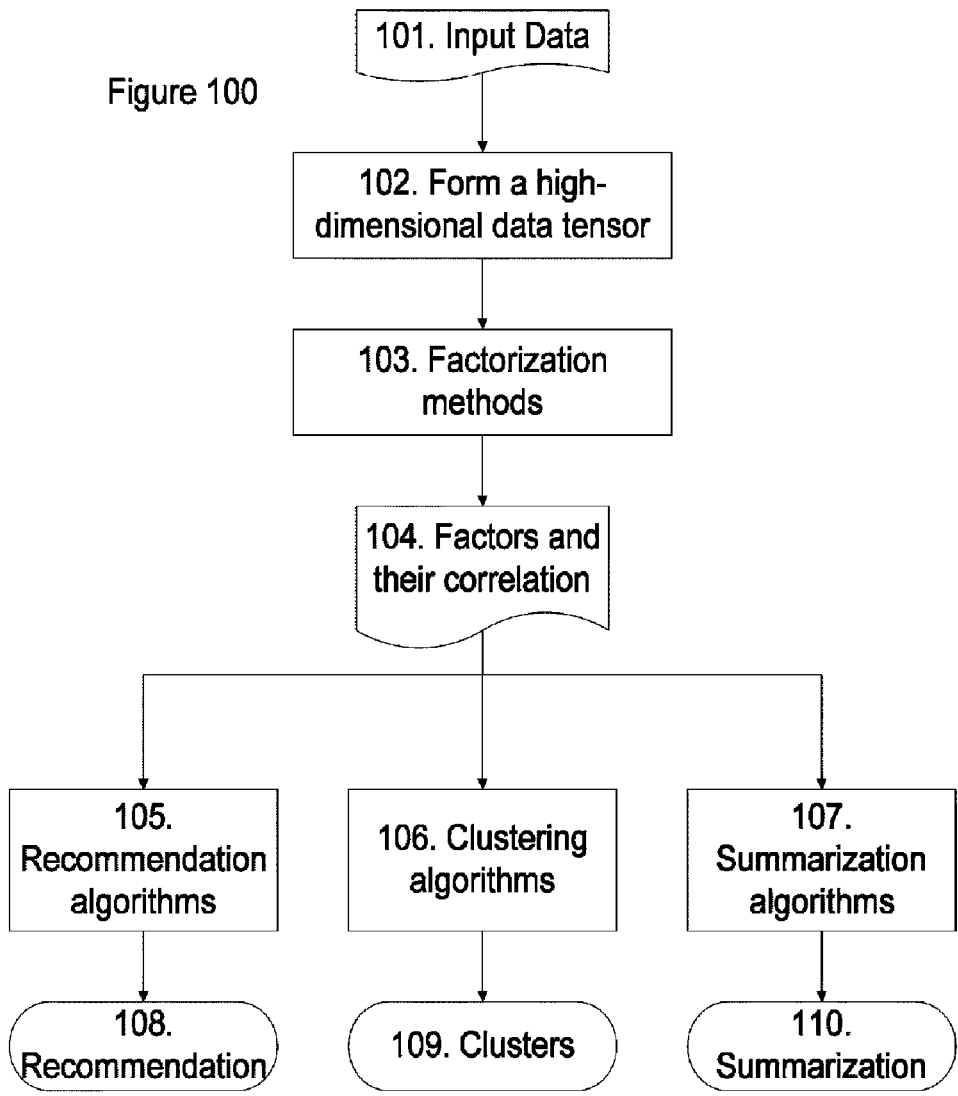
FIG. 1 shows an exemplary process to factorize high-dimensional data into factors in each dimension as well as the correlation among factors in different dimensions.

FIG. 1 shows an exemplary process to factorize high-dimensional data into factors in each dimension as well as the correlation among factors in different dimensions. The process solves the problem by factorizing all the dimensions simultaneously. As a result, the higher-order correlations among different dimensions are kept. In addition, the correlation among factors in different dimensions is explicitly captured. This method uses a generative model to generate the data and translates the generative model into the problem of non-negative tensor factorization, where the objective is to minimize a certain loss between the observed data and the data predicted by the generative model. Such a loss includes Kullback-Leibler divergence and Frobenius tensor norm. We provide solution for both loss metrics. The minimization process results a set of matrices which represent the factors in different dimensions of the data. The minimization process also results a tensor that represents the correlations among the factors in different dimensions of data.

Turning now to FIG. 1, the input of this method is high-dimensional data (101). The system then constructs the data tensor from the input data (102). The data tensor is denoted by A, where each mode of A corresponds to a dimension of the input data. An index for a dimension can be either unordered, e.g., when the dimension corresponds to terms in a document, or ordered, e.g., when the dimension corresponds to the generation time of a document. Each entry of A represents the number of occurrences of a certain datum in the input data with a fixed set of indices in the dimensions. The system applies the factorization algorithms to the data tensor (103). This procedure is detailed in FIG. 2.

Next, the factors in different dimensions of the data and the correlation among the factors (104). These are the output obtained by using the factorization algorithms (103). The factors can be interpreted as the probabilistic distribution for a given concept for a given dimension. The correlation captures the relationship among different concepts in all the dimensions. The system can apply recommendation algorithms that take advantage of the factors and their correlation (105). The result of the recommendation can be generated (108). Clustering algorithms that take advantage of the factors and their correlation can also be applied (106) and clustering results are generated (109). The system also can execute summarization algorithms that take advantage of the factors and their correlation (107) and generates summarization results (110).

Figure 2:
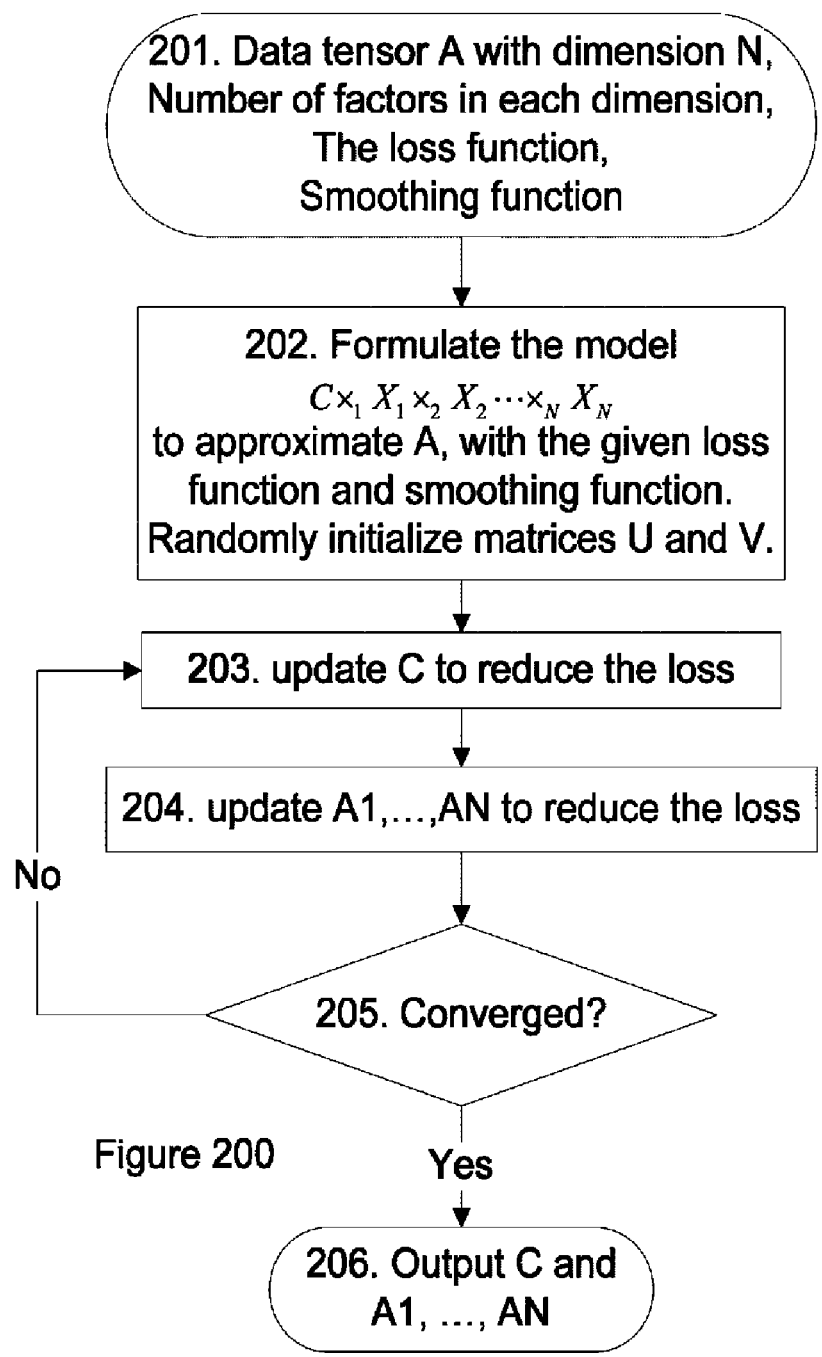
FIG. 2 shows an exemplary process to factorize the data tensor.

Referring now to FIG. 2, a process to factorize the data tensor is shown. The input of this process is the data tensor A from 102, and the number of factors the user wants, the loss function and smoothing function that the user chooses (201). The process formulates a model $Cx_1X_1x_2X_2\ldots x_NX_N$ where $X_1,\ldots,X_N$ are the factors in the first, the second, ..., and the N-th dimensions, C is the core tensor to capture the correlation among the factors $X_1,\ldots,X_N$ (202). The entries of $X_1,\ldots,X_N$ are nonnegative. The sum of each column of $X_1,\ldots,X_N$ is one. The size of $X_i$ depends on the size of the i-th dimension of A as well as the number of factors that the user wants in the i-th dimension. The entries of C are also nonnegative. The size of C depends on the number of factors that the user wants in all the dimensions. The loss between A and $Cx_1X_1x_2X_2\ldots x_NX_N$ can be Kullback-Leibler divergence, or Frobenius tensor norm. Next, the process updates C to reduce the loss (203). More detail on the update formula is discussed below. The process then updates $X_1,\ldots,X_N$ to reduce the loss, as discussed in more details below (204). Next, in 205, the process repeat 203 and 204 until the loss converges. The process returns the core tensor C and the factors $X_1,\ldots,X_N$ as the output of this procedure (206).

In one implementation, a simple factor model for analyzing polyadic data is used to capture the factors in all the dimensions simultaneously. In addition, the relationships among the factors in different dimensions are also captured. The model is an extension of the factor model proposed by Hofmann to higher-dimensional cases. In addition, when the KL-divergence is used, the proposed factor model is equivalent to the non-negative version of the Tucker model in tensor factorization. An EM-style iterative algorithm can be used for solving the non-negative tensor factorization (NTF) problem. Based on the probabilistic interpretation of the factor model, a discriminative version and a version that contains regularization on the sparseness of the results are described. Based on the NTF interpretation of the factor model, a version that uses Frobenius norm instead of the KL-divergence is used to measure the error. Efficient implementations of the algorithms take advantage of the sparseness of data and have provable time complexity linear (per iteration) in the number of data records in a dataset.

Potential applications to the factor model include:
Extracting and monitoring coherent groups of people and topics
Ranking and recommending important people and documents
Summarizing and visualizing data The factor model has been applied to the problem of personalized recommendation. The model is applied to collaborative tagging dataset (Delicious) and a paper citation dataset (CiteSeer) to demonstrate its effectiveness. For easy discussion, 3-dimensional data is used, although the proposed models apply to data of arbitrary dimensions.

In the CiteSeer data, each data record is an author-topic-reference triple. In total there are I authors, J topics, and K references in the dataset. There are L latent groups (factors) of authors. That is, an author belongs to these L groups with different probabilities. A random variable C' to represent the L latent groups of authors. Similarly, there are M latent factors of topics and N latent factors of references, and random variables C'' and C''' are used to represent them. It is worth noting that the cardinalities of C', C'', and C''' do not have to be identical. In the following discussion, i, j, and k represent the indices for author, topic, and reference, respectively. And l, m and n represent the indices for the factors of the author, topic, and reference, respectively. With these factors defined, each data record, i.e., each author-topic-reference triple $a_{ijk}$, is generated in the following way: a factor $c'_l$ for author, a factor $c''_m$ for topic, and a factor $c'''_n$ for reference, with probability $P(c'_l, c''_m, c'''_n)$; an author i with probability $P(i|c'_l)$, a topic j with probability $P(j|c''_m)$, and a reference k with probability $P(k|c'''_n)$. To further simplify the notation, $P(c'_l, c''_m, c'''_n)$ is written as $P(c_{lmn})$ and $P(i|c'_l)$, $P(j|c''_m)$ and $P(k|c'''_n)$ as $P(i|l)$, $P(j|m)$, and $P(k|n)$ respectively.

Then according to the generative model, the likelihood for an observed data record $a_{ijk}$ is $$\sum_{l,m,n} P(c_{lmn})P(i|l)P(j|m)P(k|n).$$

To obtain the final model, the maximum likelihood estimation is determined for the parameters $P(c_{lmn})$, $P(i|l)$, $P(j|m)$, and $P(k|n)$. $P(i|l)$ can be written as an I×L matrix X, $P(j|m)$ as a J×M matrix Y, and $P(k|n)$ as a K×N matrix Z. Also if $P(c_{lmn})$ is written as $C_{lmn}$, then under the multinomial model the MLE problem becomes $$\underset{X,Y,Z,C}{\operatorname{argmax}} \prod_{i,j,k} \left[ \sum_{l,m,n} C_{lmn} X_{il} Y_{jm} Z_{kn} \right]^{a_{ijk}}. \quad (1)$$

The probabilistic generative model in the previous section is then connected with the non-negative version of the Tucker tensor factorization. For this purpose, the generative model is interpreted in a slightly different way. Assume that each author i is encoded with an L-dimensional vector $\vec{x}_i \in R_+^L$, where $R_+$ represents all non-negative real numbers, each topic j is encoded by $\vec{y}_j \in R_+^M$ and each reference k by $\vec{z}_k \in R_+^N$. In addition, $a_{ijk}$ is approximated by a function of $f(\vec{x}_i \otimes \vec{y}_j \otimes \vec{z}_k)$ that belongs to a family of functions F. The best encoding, in terms of $\vec{x}_i$, $\vec{y}_j$, $\vec{z}_k$ and $f$, is determined that minimizes the following error:

$$\text{error} = \sum_{i,j,k} \text{dist}(a_{ijk}, f(\vec{x}_i \otimes \vec{y}_j \otimes \vec{z}_k)).$$

Next, the system determines which family of function F to choose from and what the distance function is. For the first question, the family of linear functions, i.e., $f_{\vec{c}}(\vec{x}_i \otimes \vec{y}_j \otimes \vec{z}_k) = \langle \otimes \vec{c}, \vec{x}_i \otimes \vec{y}_j \otimes \vec{z}_k \rangle$, where $\langle \cdot, \cdot \rangle$ represents the vector inner product, is used. For the second question, the KL-divergence between $a_{ijk}$ and $f(\vec{x}_i \otimes \vec{y}_j \otimes \vec{z}_k)$ is used, where $$KL(\vec{p} \| \vec{q}) = \sum_i p_i \log \frac{p_i}{q_i} - \sum_i p_i + \sum_i q_i. \quad (2)$$

The above formula is rewritten in the terminology of tensors. Data is placed into a data tensor $A \in R_+^{I \times J \times K}$ where $(A)_{ijk}=a_{ijk}$. The vectors $\vec{x}_i$'s are concatenated to a matrix $X \in R_+^{I \times L}$ where each row of X is the transpose of $\vec{x}_i$. Similarly $\vec{y}_j$'s and $\vec{z}_k$'s are concatenated into matrices $Y \in R_+^{J \times M}$ and $Z \in R_+^{K \times N}$. Furthermore, $\vec{c}$ is folded into a tensor $C \in R_+^{L \times M \times N}$ with $(C)_{lmn} = \vec{c}_{(l-1)MN+(m-1)N+n}$, with C being the core tensor. After the concatenation and the folding, $f_{\vec{c}}(\vec{x}_i \otimes \vec{y}_j \otimes \vec{z}_k) = (Cx_1Xx_2Yx_3Z)_{ijk}$. Then the problem of best encoding becomes finding the best approximation, in terms of X, Y, Z, and C, that minimizes the following error $$\text{error}_{KL} = KL(A \| Cx_1Xx_2Yx_3Z) \quad (3)$$

where $x_1$, $x_2$, and $x_3$ are the mode-1, mode-2, and mode-3 multiplication of the tensor C by the matrices X, Y, and Z, respectively. Please refer [?] for details.

Because $Cx_1Xx_2Yx_3Z = (Cx_1Q_Xx_2Q_Yx_3Q_Z)x_1(XQ_X^T)x_2(YQ_Y^T)x_3(ZQ_Z^T)$ for arbitrary orthogonal matrices $Q_X$, $Q_Y$, and $Q_Z$, to make the problem well posed, additional constraints are added that each column of X, Y, and Z must sums to one. Under these constraints, the problem of minimizing the error in Equation (3) is equivalent to the problem of MLE described by Equation (1). This can be seen by rewriting the MLE problem in Equation (1) as the problem maximizing the log likelihood, $$\underset{X,Y,Z,C}{\text{argmax}} \sum_{i,j,k} a_{ijk} \log\left[\sum_{l,m,n} C_{lmn} X_{il} Y_{jm} Z_{kn}\right]. \quad (4)$$

Next, the KL-divergence in Equation (3) is expanded. To avoid notation clutters, $D = Cx_1Xx_2Yx_3Z$ to arrive at:

$$\text{error}_{KL} = KL(A \| C \times_1 X \times_2 Y \times_3 Z)$$
$$= \sum_{i,j,k} a_{ijk} \log a_{ijk} - a_{ijk} \log d_{ijk} - \sum_{i,j,k} a_{ijk} + \sum_{i,j,k} d_{ijk}.$$

Several observations can be obtained from the above equation. A necessary condition for a solution D to minimize $\text{error}_{KL}$ is that $$\sum_{i,j,k} a_{ijk} = \sum_{i,j,k} d_{ijk}.$$

This also implies that a necessary condition for an optimal solution is that $$\sum_{i,j,k} a_{ijk} = \sum_{l,m,n} c_{lmn},$$

because of the constraints on X, Y, and Z. Second, A can be scaled so that $$\sum_{i,j,k} a_{ijk} = 1$$

without changing the optimization problem. Similarly, because Equation (4) can be multiplied by a constant without affecting the MLE problem, without loss of generality, $$\sum_{i,j,k} a_{ijk} = 1.$$

As a result, minimizing $\text{error}_{KL}$ is equivalent to maximizing $$\sum_{i,j,k} a_{ijk} \log d_{ijk}.$$

Due to the equivalence between the MLE problem and the NTF problem, the NTF problem can be solved in order to obtain a solution to the MLE problem. An iterative update algorithm can be used for solving the NTF problem. The problems is defined as the following. For a given tensor $A \in R_+^{I \times J \times K}$, $Cx_1Xx_2Yx_3Z$ is used to approximate A where $C \in R_+^{L \times M \times N}$, $X \in R_+^{I \times L}$, $Y \in R_+^{J \times M}$, and $Z \in R_+^{K \times N}$, and the columns of X, Y and Z all sum to ones, so that the error defined in Equation (3) is minimized.

For a given $A \in R_+^{I \times J \times K}$, another tensor B is defined as $$B_{ijk} = A_{ijk}/(Cx_1Xx_2Yx_3Z)_{ijk} \quad (5)$$

Then the following update rules are guaranteed to converge to an optimal solutions to the objective function defined in Eq. (3).

$$C_{lmn} \leftarrow C_{lmn}(Bx_1X^Tx_2Y^Tx_3Z^T)_{lmn} \quad (6)$$

$$X_{il} \leftarrow X_{il}(B_{(1)}(Y \otimes Z)C_{(1)}^T)_{il} \quad (7)$$

$$Y_{jm} \leftarrow Y_{jm}(B_{(2)}(Z \otimes X)C_{(2)}^T)_{jm} \quad (8)$$

$$Z_{kn} \leftarrow Z_{kn}(B_{(3)}(X \otimes Y)C_{(3)}^T)_{kn} \quad (9)$$

and normalize s.t. columns of X, Y, Z sum to ones.

Many applications need to address certain conditional probabilities. For example, the task of reference recommendation needs to address the conditional probability for a reference to be recommended given that the author and the topic are known. A discriminative model can be built for the conditional probability to be captured. That is, the MLE problem is given by $$\underset{X,Y,Z,C}{\text{argmax}} \prod_{i,j,k} \left[\tilde{a}_{jk} \sum_{l,m,n} P(l|m,n)P(i|l)P(m|j)P(n|k)\right]^{a_{ijk}}. \quad (10)$$

where $\tilde{a}_{jk}$ is the empirical marginal distribution and is not related to the parameters to be estimated. It can be shown that such a discriminative framework can be solve by using the original algorithm with some minor revision:

$$B_{ijk} = A_{ijk}/(Cx_1Xx_2Yx_3Z)_{ijk} \quad (11)$$

$$C_{lmn} \leftarrow C_{lmn}(Bx_1X^Tx_2Y^Tx_3Z^T)_{lmn} \quad (12)$$

$$X_{il} \leftarrow X_{il}B_{(1)}(Y \otimes Z)C_{(1)}^T)_{il} \quad (13)$$

$$Y_{jm} \leftarrow Y_{jm}(B_{(2)}(Z \otimes X)C_{(2)}^T)_{jm} \quad (14)$$

$$Z_{kn} \leftarrow Z_{kn}(B_{(3)}(X \otimes Y)C_{(3)}^T)_{kn} \quad (15)$$

and normalize s.t. rows of X sum to ones and columns of Y, Z sum to ones.

In another embodiment, the system considers the maximum a posteriori (MAP) estimation for the basic probabilistic model. For example, the Dirichlet distribution can be used as the prior distribution of the parameters.

The prior of each row of X is a Dirichlet distribution with hyper-parameter $\alpha_X > 0$ for all event. The logarithm of prior probability is $$\ln P(X) = (\alpha_X - 1) \sum_{il} \ln X_{il} + c_X,$$

where $c_X$ is a value irrelevant to X.

Similarly, the prior for Y, Z and C is assume to be Dirichlet distribution with hyper-parameters $\alpha_Y$, $\alpha_Z$ and $\alpha_C$ respectively. The logarithm of prior probabilities are $$\ln P(Y) = (\alpha_Y - 1) \sum_{jm} \ln Y_{jm} + c_Y,$$

$$\ln P(Z) = (\alpha_Z - 1) \sum_{kn} \ln Z_{kn} + c_Z,$$

$$\ln P(C) = (\alpha_C - 1) \sum_{lmn} \ln C_{lmn} + c_Z.$$

The logarithm loss of the MAP estimation is that of MLE plus the logarithm of prior probabilities. Therefore, $$\text{error}_{MAP} := \text{error}_{KL} - \ln P(X) - \ln P(Z) - \ln P(C).$$

The following update rules are guaranteed to converge to an optimal solutions to the objective function.

$$C_{lmn} \leftarrow \lfloor C_{lmn}(Bx_1 X^T x_2 Y^T x_3 Z^T)_{lmn} + (\alpha_C - 1) \rfloor_+,$$

$$X_{il} \leftarrow \lfloor X_{il}(B_{(1)}(Y \otimes Z)C_{(1)}{}^T)_{il} + (\alpha_X - 1) \rfloor_+,$$

$$Y_{jm} \leftarrow \lfloor Y_{jm}(B_{(2)}(Z \otimes X)C_{(2)}{}^T)_{jm} + (\alpha_Y - 1) \rfloor_+,$$

$$Z_{kn} \leftarrow \lfloor Z_{kn}(B_{(3)}(X \otimes Y)C_{(3)}{}^T)_{kn} + (\alpha_Z - 1) \rfloor_+.$$

and normalize s.t. columns of X, Y, Z sum to ones.

When $\alpha$ is greater than one, the corresponding variables tends to be non-zeros, and when $\alpha$ is less than one, the corresponding variables tends to be sparse.

In some cases, certain prior knowledge is available and the factors can be a convex combination of the prior knowledge (the vectors that encode this prior knowledge is called the base vectors). For example, if a dimension represents the timeline and the temporal factors need to be smooth, then one way to incorporate such prior knowledge is to restrict the temporal factors to be a convex combination of some smooth splines. Assuming $X_B \in R_+^{I \times L'}$, $Y_B \in R_+^{J \times M'}$, and $Z_B \in R_+^{K \times N'}$ being the base vectors, where each column of these base vectors sums to 1. Then the problem becomes to minimize $$\text{error}_{KL} = KL(A \| Cx_1(X_B X) x_2(Y_B Y) x_3(Z_B Z)) \tag{16}$$

where $C \in R_+^{L \times M \times N}$, $X \in R_+^{L' \times L}$, $Y \in R_+^{M' \times M}$, and $Z \in R_+^{N' \times N}$. It can be shown that the following update algorithm solves this problem.

$$B_{ijk} \leftarrow A_{ijk}/(Cx_1(X_B X) x_2(Y_B Y) x_3(Z_B Z))_{ijk} \tag{17}$$

$$C_{lmn} \leftarrow C_{lmn}(Bx_1(X_B X)^T x_2(Y_B Y)^T x_3(Z_B Z)^T)_{lmn} \tag{18}$$

$$X_{il} \leftarrow X_{il}(X_B^T B_{(1)}((Y_B Y) \otimes (Z_B Z))C_{(1)}{}^T)_{il} \tag{19}$$

$$Y_{jm} \leftarrow Y_{jm}(Y_B^T B_{(2)}((Z_B Z) \otimes (X_B X))C_{(2)}{}^T)_{jm} \tag{20}$$

$$Z_{kn} \leftarrow Z_{kn}(Z_B^T B_{(3)}((X_B X) \otimes (Y_B Y))C_{(3)}{}^T)_{kn} \tag{21}$$

and normalize s.t. columns of X, Y, Z sum to ones.

From the NTF interpretation of the model, a matrix (tensor) norm can be used instead of the KL-divergence for measuring the error. For example, if the Frobenius norm is used, then the problems is defined as the following. For a given tensor $A \in R_+^{I \times J \times K}$, $Cx_1 X x_2 Y x_3 Z$ to approximate A where $C \in R_+^{L \times M \times N}$, $X \in R_+^{I \times L}$, $Y \in R_+^{J \times M}$, and $Z \in R_+^{K \times N}$, and the columns of X, Y and Z all sum to ones, so that the following error is minimized:

$$\text{error}_F = \|A - Cx_1 X x_2 Y x_3 Z\|_F^2 \tag{22}$$

where for a tensor A:

$$\|A\|_F^2 = \langle A, A \rangle = \sum_{i,j,k} a_{ijk}^2.$$

For a given $A \in R_+^{I \times J \times K}$, then the following update rules are guaranteed to converge to an optimal solutions to the objective function defined in Eq. (22).

$$C_{lmn} \leftarrow C_{lmn} \frac{(A \times_1 X^T \times_2 Y^T \times_3 Z^T)_{lmn}}{(C \times_1 (X^T X) \times_2 (Y^T Y) \times_3 (Z^T Z))_{lmn}}, \tag{23}$$

$$X_{il} \leftarrow X_{il} \frac{(A_{(1)}(Y \otimes Z)C_{(1)}^T)_{il}}{(XC_{(1)}((Y^T Y) \otimes (Z^T Z))C_{(1)}^T)_{il}}, \tag{24}$$

$$Y_{jm} \leftarrow Y_{jm} \frac{(A_{(2)}(Z \otimes X)C_{(2)}^T)_{jm}}{(YC_{(2)}((Z^T Z) \otimes (X^T X))C_{(2)}^T)_{jm}}, \tag{25}$$

$$Z_{kn} \leftarrow Z_{kn} \frac{(A_{(3)}(X \otimes Y)C_{(3)}^T)_{kn}}{(ZC_{(3)}((X^T X) \otimes (Y^T Y))C_{(3)}^T)_{kn}}, \tag{26}$$

and normalize s.t. columns of X, Y, Z sum to ones.

In the following discussion, without loss of generality, it is assumed that $L \geq M \geq N$ and $I \geq J \geq K$. In addition, there are nz data records in the dataset, which implies that there are nz non-zero entries in the data tensor A.

A naive implementation of the update algorithms will expand $Cx_1 X x_2 Y x_3 Z$, which turns out to be a dense tensor in $R_+^{I \times J \times K}$. Because such a dense tensor contains IJK entries, it is impractical to make such an explicit expansion (e.g., consider a dataset with 10K authors, 10K keywords, and 10K references, where IJK=1 trillion). The implementation of FIG. 1 takes advantage of the sparseness of the dataset and has a (per iteration) time complexity that is linear in nz, the number of non-zero entries in the raw data tensor A. Assuming the data is stored in the format of ⟨key1,key2,key3,value⟩, where key1, key2 and key3 are the indices of the data record in the first, second, and third dimensions, respectively; value is the value of the data record, which can be, for example, the number of times that an author cite a reference on a topic. In the first step of the algorithm, the data is sorted according to key1 as the major key and then key2 and then key3 as the minor keys. This sorting takes time linear in nz because the keys are integers with known bound and therefore linear sorting, such as bucket sort, can be applied. In addition, to simplify the discussion, it is assumed that ⟨key1,key2,key3⟩ is a primary (unique) key for the data records.

As an example, a process for computing B in Equation (5) is discussed next. Other computations can be conducted in a similar fashion. First, the implementation is a lazy one where only the absolute necessary computations are performed. In such a lazy fashion, the implementation takes advantage of the sparseness of the data. The second key idea of the implementation is that the computations are carefully ordered in a way such that repeated computations are minimized.

```
input: data records <key1,key2,key3,value>
     output: B
   i ← -1, j ← -1 ;
   for each data record <key1,key2,key3,value> do
   if i ≠ key1
       i ← key1, j ← -1 ;
       D ← fold(X_{row_i} · C_{(1)});
   if j ≠ key2
       j ← key2 ;
       d ← Y_{row_j} · D ;
   b_{ijk} ← value/(d·Z_{row_k}^T);
   return B ;
```

In the algorithm, D is an M×N matrix and $\vec{d}$ is a vector of length N. Note that fold(•) is a function for folding a vector into a matrix. It is not necessary and is used here only for illustration purpose. One additional good property of this implementation is that since data records are accessed sequentially, the algorithm can be easily parallelized.

One of the applications of the factor model is to make personalized recommendation. However, one request for this application is fast recommendation, because very often recommendations are made in real time and where long time delay is unacceptable.

In one embodiment, Fagin's algorithm is adopted for fast recommendation by taking advantage of the skewness of the data. As $A:C x_1 X x_2 Y x_3 Z$ and so for a keyword j, a given author k, the scores for the references are $X \cdot C_{(1)}(Y_{row_j}^T \otimes Z_{row_k}^T)$. The system does not need to compute all the elements of $X \cdot C_{(1)}(Y_{row_j}^T \otimes Z_{row_k}^T)$ in order to make correct top-K recommendations.

For a monotonic function, Fagin's algorithm can be used to compute top-K answers without computing all scores. A function $f(x,y,z, \ldots)$ monotonic if $\{x_1 \geq x_0, y_1 \geq y_0, z_1 \geq z_0, \ldots\} \Rightarrow f(x_1,y_1,z_1, \ldots) \geq f(x_0,y_0,z_0, \ldots)$. In the case, $f(X_{row_i})=X_{row_i} \cdot C_{(1)}(Y_{row_j}^T \otimes Z_{row_k}^T)$ is a monotonic function because everything is non-negative.

With the instant technique that takes prior knowledge as the base for the factorization, the prior knowledge can be used as some candidates for the summarization. Then by selecting the candidates corresponding to the largest values in the core tensor, the system can obtain summarizations for all the dimensions simultaneously.

The factors obtained by using the factorization method can be directly used for data analysis. For example, in the Blogosphere, bloggers cite each others on various topics at different time. So a data record in a blog dataset can be "blog A links to blog B on topic C at time D", i.e., a <A,B,C,D> quadrable. For such a dataset, a large value in the core tensor together with the corresponding factors in different dimensions can represent an event that "certain group of bloggers form a community with certain structure on certain topic at certain time".

The factors obtained by using the factorization method can also be used for personalized recommendation. For example, if the dataset consists of author-topic-reference triples, then for a given author and a given topic, the system can recommend references that are related to both the topic and the author's preference.

The factors obtained by using the factorization method naturally form clusters. An advantage of the method is that in addition to the clusters in various dimensions, which are represented by the factors in the corresponding dimensions, the method also gives the correlation among the clusters, which is represented by the core tensor. As a result, in addition to the overall clustering, the system can efficiently drill down into the clusters specific to certain subgroups. For example, the system can obtain clusters specific to an author community or specific to a time period by selecting the corresponding subsets of core tensor.

For summarization applications, prior knowledge can be set a candidates for summarization. By selecting candidates corresponding to largest values in the core tensor, the system can obtain summarization for all dimensions simultaneously.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a block diagram of a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

What is claimed is:

1. A method for factorizing high-dimensional data, comprising:
   simultaneously capturing factors for all data dimensions and their correlations in a factor model; and
   generating a corresponding loss function to evaluate the factor model expressed as a non-negative tensor factorization and to minimize a predetermined loss between observed data and data predicted by the generative model; and
   applying EM-style iterative algorithm for solving the non-negative tensor factorization.

2. The method of claim 1, comprising generating a data tensor from the high dimensional input data.

3. The method of claim 1, comprising generating one or more factors and factor relationships using a factorization algorithm.

4. The method of claim 1, comprising applying the factors and their relationships to a recommendation application.

5. The method of claim 1, comprising applying the factors and their relations to the clustering application.

6. The method of claim 1, comprising applying the factors and their relations to the summarization application.

7. The method of claim 1, comprising applying a Kullback-Leibler divergence to measure an error in tensor factorization.

8. The method of claim 1, comprising applying alternative algorithm to learn the model parameters.

9. The method of claim 1, comprising applying a Frobenius tensor norm to measure an error in tensor factorization.

10. The method of claim 1, comprising deriving a probabilistic factor model.

11. The method of claim 10, wherein the probabilistic factor model is used generate a discriminative version and a version containing regularization on result sparseness.

12. The method of claim 1, comprising approximating the data using a non-negative tensor factorization.

13. The method of claim 1, comprising generating a set of matrices which represent the factors in different dimensions of the data.

14. The method of claim 1, comprising generating a tensor representing correlations among the factors in different dimensions of data.

15. A system for factorizing high-dimensional observed data, comprising:
   means for deriving a generative model that simultaneously captures factors for all data dimensions and their correlations;
   means for generating predicted data and mapping the generative model into a non-negative tensor factorization and means for minimizing a predetermined loss between observed data and data predicted by the generative model; and
   means for minimizing the predetermined loss between the observed data and the predicted data and to generate a tensor that represents the correlations among the factors in different dimensions of data by applying EM-style iterative algorithm for solving the non-negative tensor factorization.

16. The system of claim 15, comprising means for generating a set of matrices which represent the factors in different dimensions of the data with the regenerative model including $Cx_1 X_1 x_2 X_2 \ldots x_N X_N$, where $X_1, \ldots, X_N$ are the factors in first, second, ..., and N-th dimensions, C is a core tensor to capture a correlation among the factors $X_1, \ldots, X_N$, where $X_1, \ldots, X_N$ are nonnegative and a sum of each column of $X_1, \ldots, X_N$ is one.

17. The system of claim 15, comprising means for generating a tensor representing correlations among the factors in different dimensions of data.

18. The system of claim 15, comprising means for applying EM-style iterative algorithm for solving the non-negative tensor factorization (NTF).

* * * * *